(Model.)

6 Sheets—Sheet 1.

C. LIDREN.
GRAIN BINDING APPARATUS.

No. 287,695. Patented Oct. 30, 1883.

Witnesses:
Phil. C. Dittrich
Wm. R. Keyworth

Inventor.
Christopher Lidren
per M. Alexander
Attorney.

(Model.)

6 Sheets—Sheet 2.

C. LIDREN.
GRAIN BINDING APPARATUS.

No. 287,695. Patented Oct. 30, 1883.

(Model.)

6 Sheets—Sheet 5.

C. LIDREN.
GRAIN BINDING APPARATUS.

No. 287,695. Patented Oct. 30, 1883.

Witnesses:
Phil C. Dietrich.
W. R. Keyworth.

Inventor:
Christopher Lidren.
per J. W. Alexander
Attorney.

(Model.)   6 Sheets—Sheet 6.
C. LIDREN.
GRAIN BINDING APPARATUS.
No. 287,695.   Patented Oct. 30, 1883.
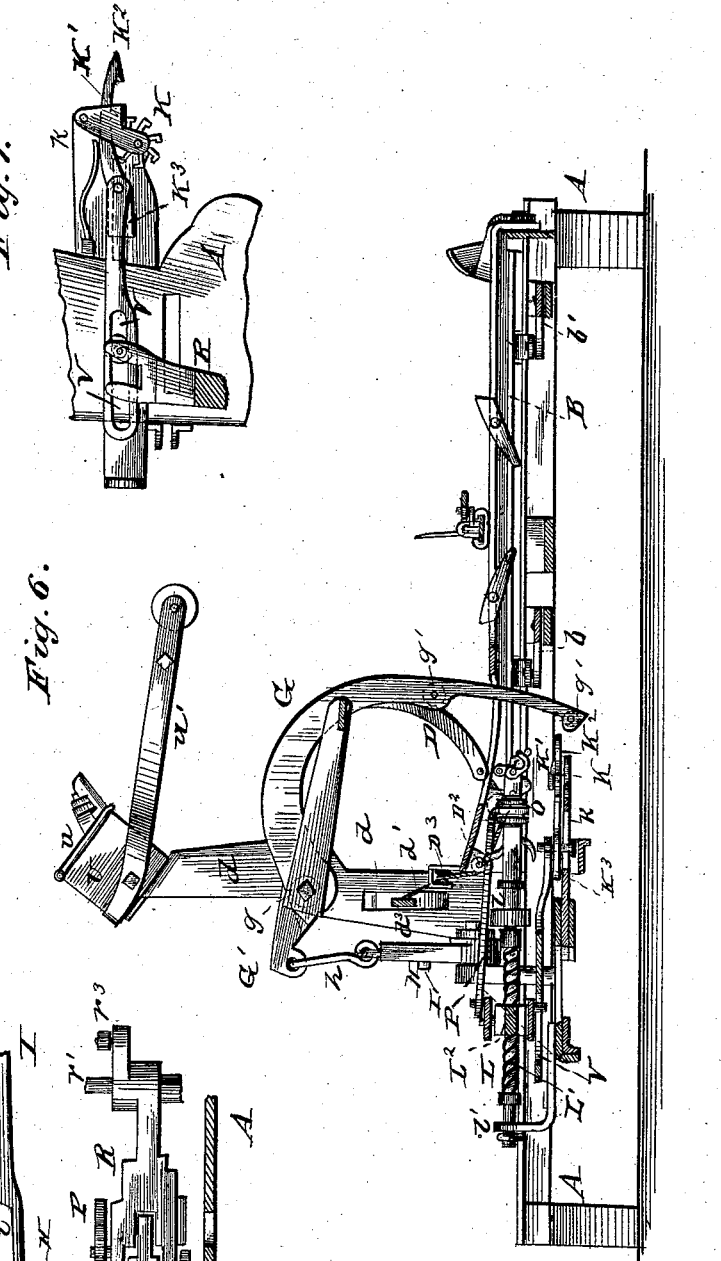
Witnesses:
Inventor:
Christopher Lidren
per Alexander
Attorney.

UNITED STATES PATENT OFFICE.

CHRISTOPHER LIDREN, OF LAFAYETTE, INDIANA, ASSIGNOR TO HIMSELF AND RELIEF JACKSON, OF SAME PLACE.

GRAIN-BINDING APPARATUS.

SPECIFICATION forming part of Letters Patent No. 287,695, dated October 30, 1883.

Application filed September 26, 1882. (Model.)

*To all whom it may concern:*

Be it known that I, CHRISTOPHER LIDREN, of Lafayette, in the county of Tippecanoe and State of Indiana, have invented certain new and useful Improvements in Grain-Binding Apparatus; and I do hereby declare that the following is a full, clear, and exact description thereof, reference being had to the accompanying drawings, and to the letters of reference marked thereon, which form a part of this specification, in which—

Figure 1:
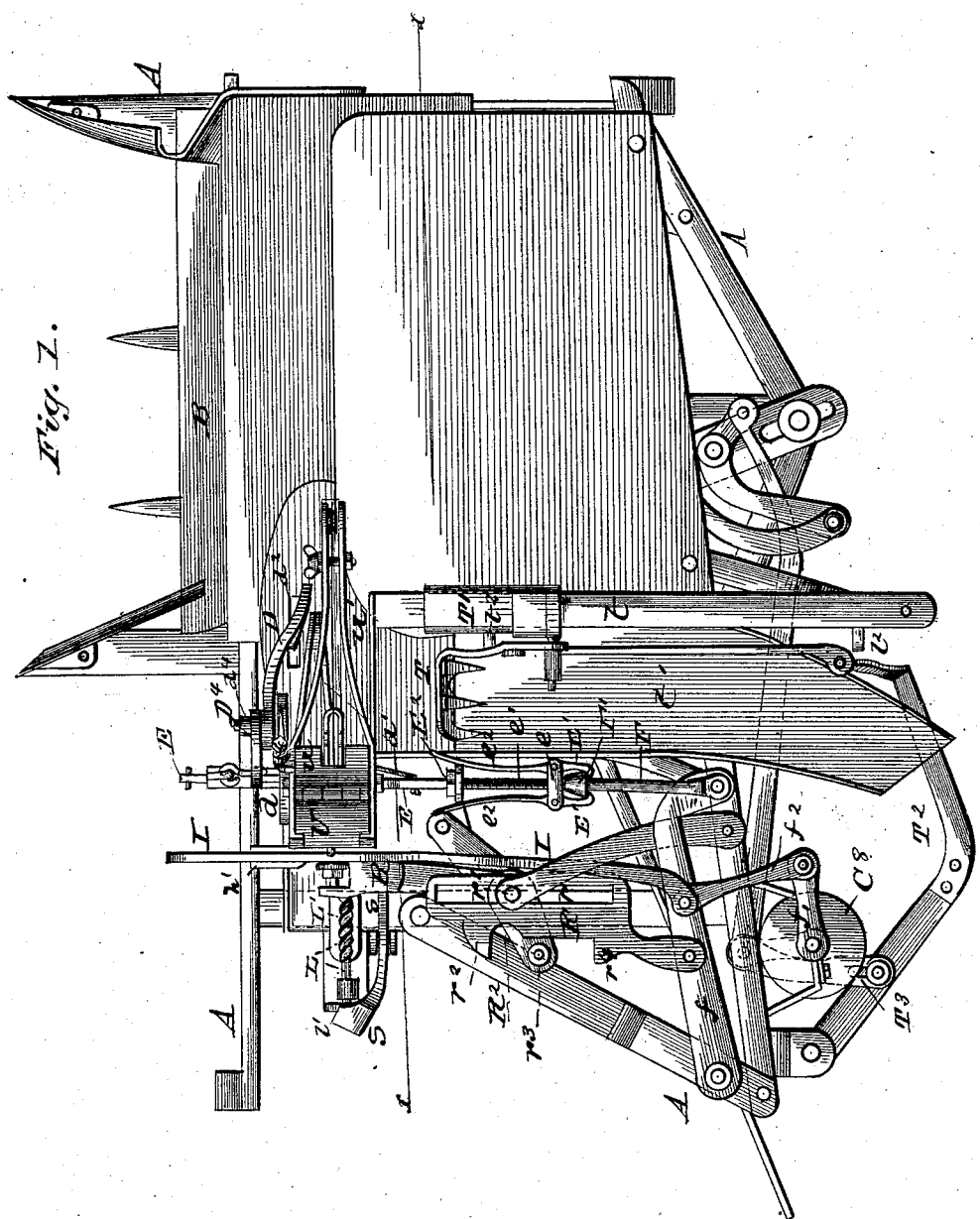
Figure 2:
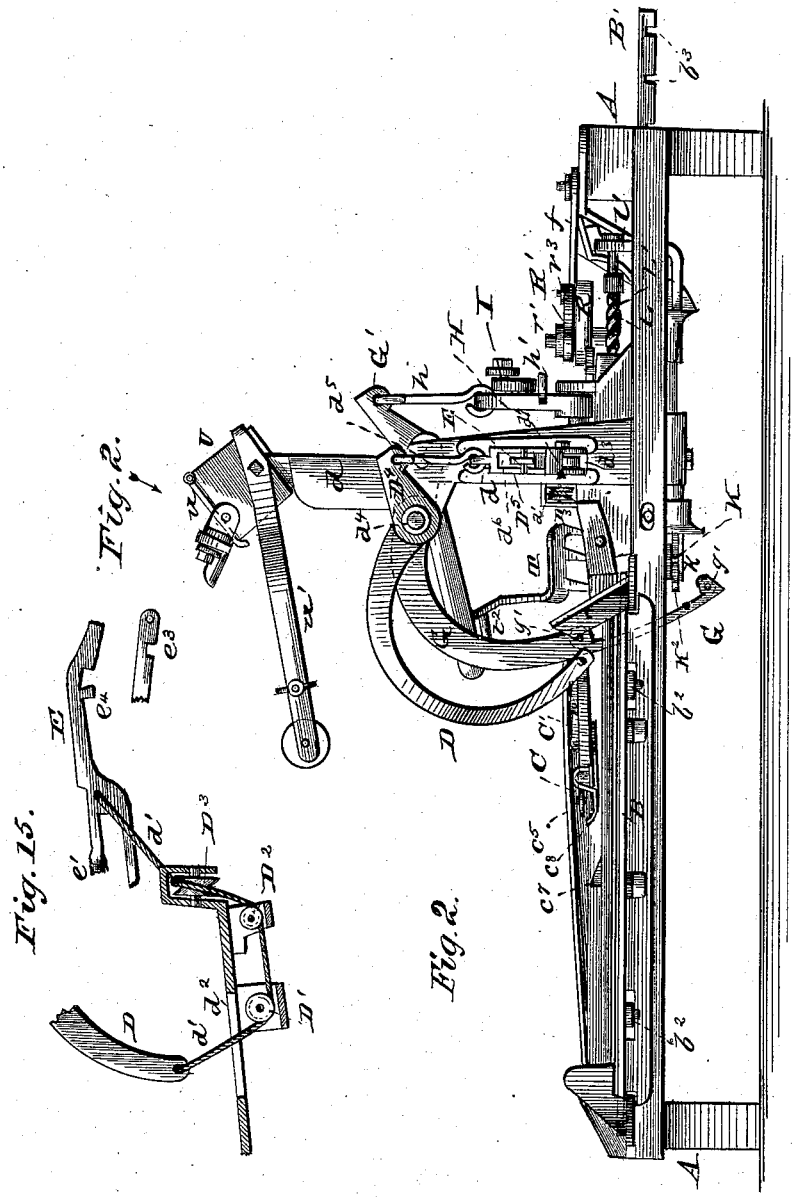
Figure 3:
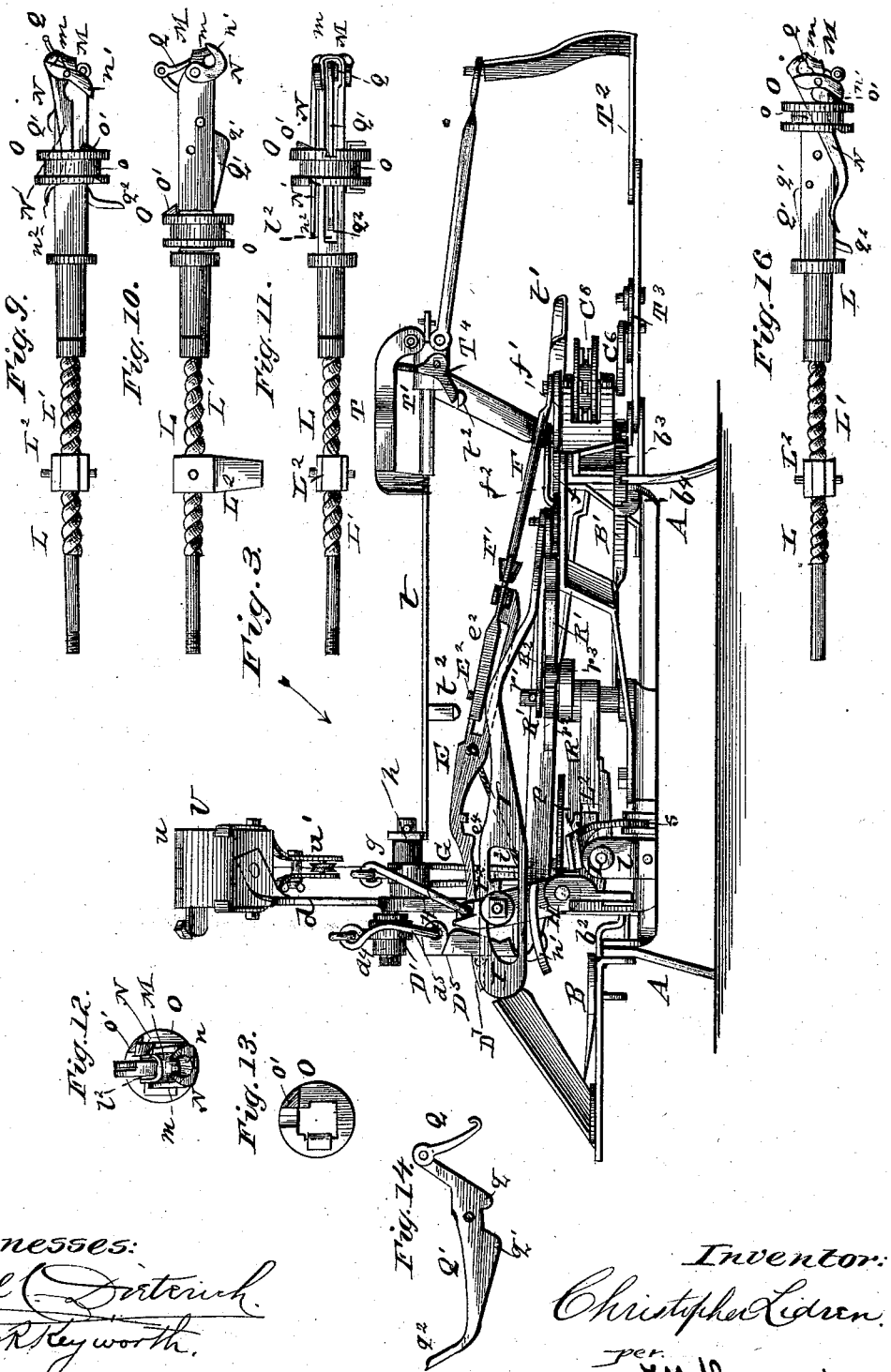
Figure 4:
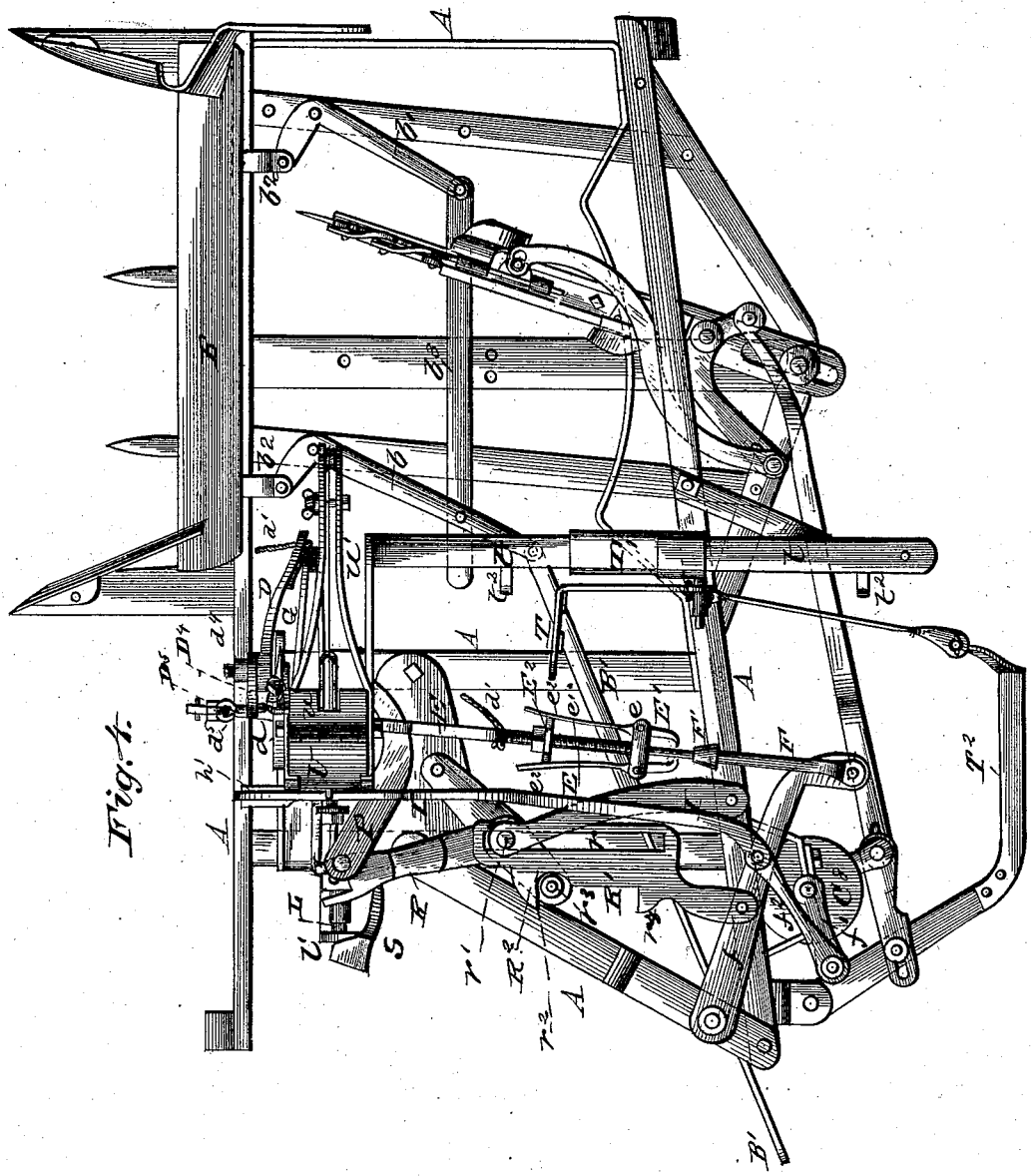
Figure 5:
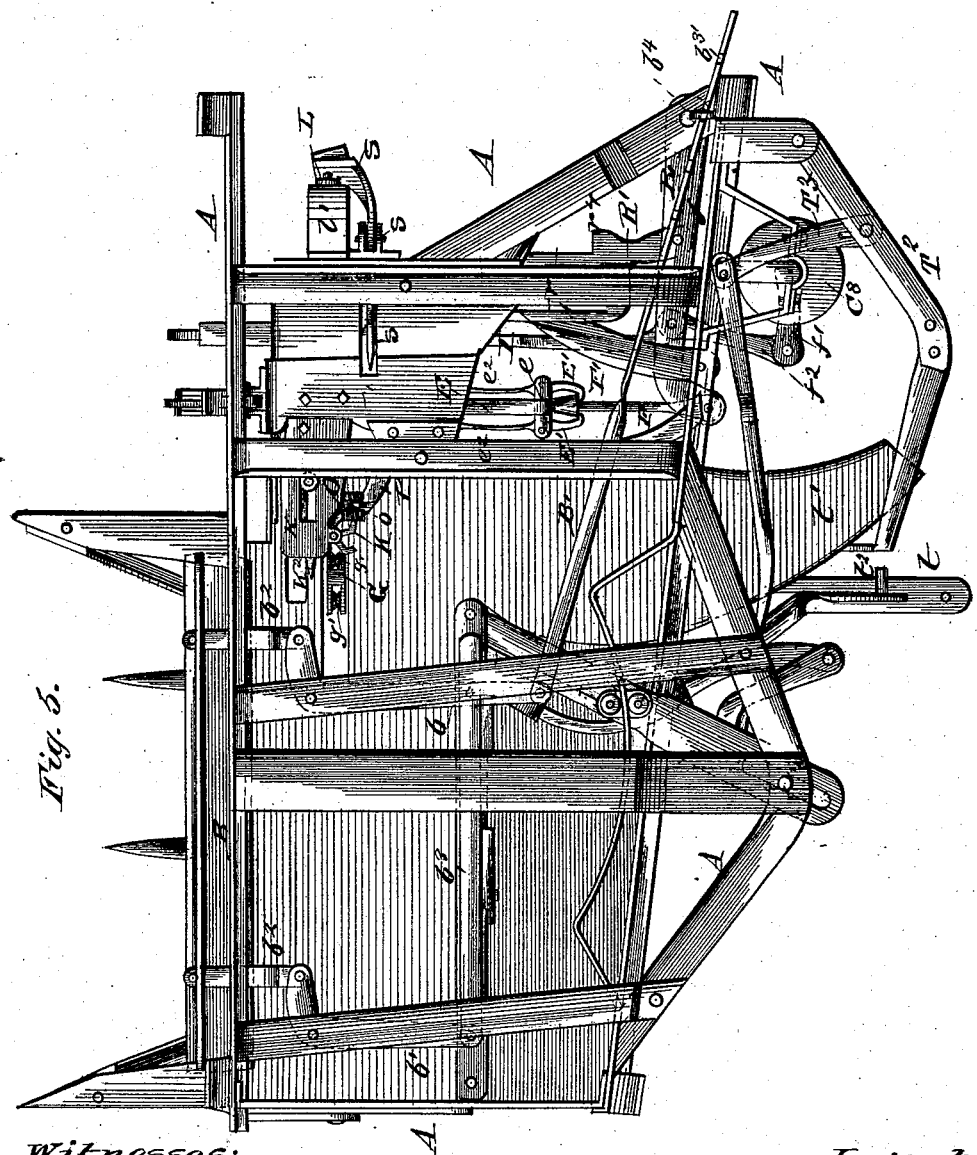

Figure 1 is a top or plan view. Fig. 2 is a front elevation. Fig. 3 is a stubble-side elevation. Fig. 4 is a plan view with the grain-platform removed. Fig. 5 is a bottom plan view. Fig. 6 is a vertical sectional view taken in the plane indicated by the dotted line $x\,x$, Fig. 1. Figs. 7, 8, 9, 10, 11, 12, 13, 14, 15, 16 are detail views of various parts of the same. Fig. 17 represents a detail view.

This invention relates to that class of grain-binders in which a binding-cord is employed.

My improvements relate to mechanism for tightening a compressing-cord around the gavel and holding the same taut during the operation of binding and tying, and then allowing the compressing-cord to slacken, so that the bundle can be carried off; also, to means for allowing the compressing-cord tightener to exert a certain predetermined tension upon the compressing-cord; also, to devices for actuating and timing the movements of the binder-arm; also, to a simple and effective knot-tying mechanism; and, finally, to certain novel features of construction and combination, hereinafter fully described.

In this machine the various parts of the main frame are indicated by the letter A, and arranged so as to constitute suitable supports for the various operative devices, which will now be described.

The finger-bar B is arranged to be thrown forward or retracted to a greater or less extent at the will of the operator. To effect such movements or adjustments of the finger-bar, I pivot two bent levers, $b\,b'$, to the main frame, and connect their short forward arms with the finger-bar by means of straps $b^2$. The rear long arms of these levers are connected together by a connecting-rod, $b^3$, and to the end of one of said long arms is connected a rod, B', which extends back to one of the rear corners of this machine. By pushing or drawing upon this rod the two connected levers will be actuated simultaneously, and the finger-bar moved forward or backward, according to the direction in which the operator moves the rod B'. To hold said bar after the finger-bar has been adjusted, the rod is provided with a series of notches, $b^3$, each adapted to receive a stationary catch, $b^4$, attached to the main frame. This catch consists of a plate having a notch, in which the rod B' works and is guided during its movement. A sprocket-wheel, $C^8$, will be connected by an endless chain with a like wheel upon one of the main supporting and driving wheels, and constitutes the source from which power is derived for driving the several operative devices herein described.

C indicates the rake, employed for sweeping the platform and carrying the gavel forward to the compressing and binding devices. The rake will, during its oscillatory movements, traverse the platform in substantially a straight line, instead of in the arc of a circle.

The compressor-arm D is pivoted upon a vertical standard, $d$, and carries, fastened to its outer end, a rope or cord, $d'$, for compressing the gavel before the knot is tied in the binding-cord. This compressing-cord $d'$ passes from the end of the compressor down through a slot, $d^2$, in the platform, thence under the two grooved pulleys D' D² below the latter, thence upward and over a grooved pulley, D³, at the forward inner corner of the platform, after which it is carried back and secured to a reciprocatory bar, E, employed for tightening the cord upon the gavel. This reciprocatory bar or compressing-cord tightener works through a slot, $d^3$, in the standard $d$, and carries in rear of said standard a pair of spring-jaws, E', pivoted in the ends of a cross-head, $e$, which is fastened upon the bar or rod E. The ends of these jaws are normally held nearly against said rod by means of a nut, E², which is fitted upon a screw-threaded portion, $e'$, of the rod E, between the spring-shanks $e^2$ of the jaws, the said nut spreading apart the spring-shanks, and thus closing the jaws at the other side of the pivot, so as to bring them nearly into contact with the rod. That portion of the rod which passes through the slotted standard is flat, and provided with two notches, $e^3$ $e^4$, the former of which is near its extreme forward end. The rear end of the rod E is adapted to slide in a hollow rod, F, which is pivoted to a lever, $f$, and is provided at its forward end with a hollow conical head, F′. The lever $f$ is pivoted to the main frame and operated by means of a crank-arm, $f'$, upon the shaft of the sprocket-wheel C³, a link or connecting-rod, $f^2$, being employed to connect said crank-arm with the lever. A short arm, D⁴, projects from the hub $d^4$ of the compressor-arm D, and in the opposite direction from said arm, and connects by a link, $d^5$, with a lever, D⁵, which is pivoted to the standard, in front of the vertical slot in the same. The lever D⁵ is provided with a slot, $d^6$, through which the forward flat end of the rod E passes, said lever being also provided with a tripping finger or tappet, $d^7$, adapted, at certain stages of the operation of the machine, to strike against the under side of bar E and lift the same, for a purpose which will be hereinafter explained. As the rake brings the gavel forward to the compressing-cord the compressor-arm will rise, thereby allowing the gavel to pass under it. This rising is effected by the bar E being pushed forward by the conical head F′ on the hollow arm F moving forward and acting against the jaws on the bar or rod E. Said bar, in such movement, actuates, by the engagement therewith of the notch $e^3$, the lever D⁵, which in turn causes the compressor-arm to rise, as just stated. As soon as notch $e^4$ engages the lever D⁵, which will have been swung out from standard $d$ to its farthest extent by the engagement therewith of the notch $e^3$ in the end of the bar, the movement of rod E will be arrested, so that a continuance of the forward movement of the hollow arm F will force its conical head F′ in between the rod and the spring-jaws, which will then clasp and hold the conical or wedge-shaped head. The lever $f$, to which the hollow rod F is pivoted, will then be swung back by reason of its connection with the crank-arm on the axle of the sprocket-wheel, and in such movement it will draw back the hollow rod, and consequently cause a like movement of rod E, with which the compressing-cord is connected. As the rod E is thus drawn back it will cause the lever D⁵ to swing back toward standard $d$, the notch $e^4$ of the rod engaging the lever, so as to lower the compressing-arm, and thereby bring the cord around the gavel. As the lever D⁵ is thus moved back the tripping-finger $d^7$ of said lever strikes against the under side of the forward flat end of rod E and raises this end of the rod, in order to disengage its notch $e^4$ from the lever D⁵ and allow the rod E to be further drawn back. As the said rod of the compressing-cord tightening mechanism is drawn back the said cord will be drawn tight around the gavel, it being remembered that after passing over the several pulleys described one end of the cord is attached to the compressor-arm, while the remaining end is connected to the cord-tightening rod E. As soon as the cord has been tightened to the required extent upon the gavel, and the knot has been tied in the binding-cord, as hereinafter described, a further back movement of the hollow rod draws its conical head from between the spring-jaws, thus liberating the rod E from its fixed connection with the hollow rod F, which latter slides back a short distance upon the rear end of the rod E. In drawing the hollow head from between the jaws the notch $e^3$ will catch upon the lever D⁵, so that said lever will swing up against the standard and hold the rod while the hollow rod, with its wedge-shaped or conical head, is being drawn back. As the hollow rod is again moved forward it will slide upon rod E until its conical head acts against the jaws and pushes the rod forward, and by its notch $e^3$ thereby swings lever D⁵ outward or away from the standard. As said lever thus swings outwardly it will, through link $d^5$, depress the arm D⁴, which is a rigid extension from the hub of the compressor-arm, and hence cause the latter to rise. As soon as notch $e^4$ engages lever D⁵, notch $e^3$ disengaging automatically from said lever as soon as the latter has been swung out to a certain extent, the said lever will be swung out to its farthest extent and the conical head be forced in between the spring-jaws. After this a repetition of the operations already described takes place. By adjusting the nut which is arranged upon the rod I between the spring-shanks of the jaws the clamping-power of said jaws can be altered, so that the jaws can be adapted to release the head upon the hollow arm as soon as a predetermined degree of tension has been exerted upon the compressing rope or cord.

G indicates the curved binder-arm, fixed upon a hub, $g$, which is mounted upon a pivot projecting from the side of the standard $d$ opposite to the pivot of the compressor. This binder-arm carries two grooved pulleys, $g'$, for the binding-cord to pass over, one of said pulleys being arranged between two ears at the forward end of the said arm. At the rear end of the binder-arm, and extending opposite thereto from the hub, is a short arm, G′, connected with a pivoted vibratory arm, H, by means of a link, $h$. This vibratory arm is pivoted to the main frame, and provided with a tappet, $h'$, adapted at certain times during the operation of the machine to act upon a reciprocating bar, I, which serves to transmit motion from lever $f$ to the vibratory arm H, in order to cause the requisite movements of the binder-arm. The reciprocating bar I is provided with a slot, $i$, through which passes a pin, I′, secured to the vibratory arm H, the bar being held upon the pin by means of a nut and washer on the end of the pin. The upper wall of the slot in this reciprocating bar is provided with a lug or stop, I², which, as the bar is reciprocated, will strike against the pin I'. Now, when the rake is in position, ready to commence its travel toward the binding mechanism, the pin I' will be at the forward end of slot $i$. As the rake advances the reciprocating bar I will be moved forward, and when stop $I^2$, which is on the bar between the ends of the slot, strikes pin I' the vibratory arm H will be swung toward the front of the machine, so as to draw down the short arm G' of the binder-arm, and thus raise the binder-arm, so that the rake can pass the gavel under the same. After the vibratory arm has been swung forward to the required extent the stop will ride over the pin, after which the rear end of the slot will strike the pin and further raise the binder-arm. As the slotted reciprocating bar is drawn back the binder-arm will be pulled back by said pin and cause the vibratory arm H to assume a vertical position. When the stop strikes the pin on said vibratory arm H during this backward movement of the reciprocating bar I, it will swing the vibratory arm back sufficiently to cause its tappet to strike against the under side of bar I and raise the latter so that its stop will clear the pin, and thus allow the bar to continue its back movement until the pin is again at the forward end of the slot. While the reciprocating bar is being drawn back during the latter part of its motion the knot-tying devices are actuated so as to tie the knot in the manner hereinafter described.

K indicates the rotary cord-holder, which consists of a star-wheel having its points or teeth bent at their ends, to enable the wheel to be turned by the hook $K^2$ with more certainty than if they were straight. The binding-cord is caught and held between any one of these teeth and the lower plate, $k$, on which the wheel turns, and at the proper moment the wheel brings the cord against a cutter, K', which severs the cord below the knot. The rotary cord-holder is partially rotated at stated intervals by a hook, $K^2$, pivoted to the forward end of a slide, $K^3$. The pivot which connects these two parts extends through a slot in the plate $k$, so as to guide the slide in its reciprocatory movements. The slide with which the hook for actuating the rotary cord-holder is connected is in turn connected with the bell-crank lever R by a pin on the latter entering a slot, V, in the slide, whereby the slide will be operated only when the pin reaches the ends of the slot.

Referring now to the knotting mechanism, L indicates a rotary knotter-shaft, which is mounted in bearings $l\ l'$, one of which projects from the standard $d$ and the other from the side of the main frame; or both can be supported directly by the frame. This shaft is also capable of an endwise movement, and is reciprocated at certain periods to a limited extent. The rotary shaft L, which carries the devices for tying the knot, is provided at one end with a slot, $l^2$, which extends forward to the jaw M. This jaw is made rigid with the rotary shaft, and is provided with an inclined front side, $m$, which is concaved or grooved transversely to prevent the binding-cord from slipping while the loop is being formed around said jaw. The jaw M is also made hollow, so as to admit of the passage through it of the hook N, which at the proper moment is projected from the jaw, in order to catch the binding-cord, and then retracted within the jaw, in order to draw the ends through the loop. The remaining jaw N is pivoted to the sides of the rotary shaft, and is provided with a recess, $n$, through which the hook can pass when said jaw is closed. This jaw has a short arm or lug, $n'$, on one side, and it is further provided with an arm, N', bent at its end, as at $n^2$. This arm lies alongside of the shaft, and passes under a collar, O, arranged to slide upon the bar. This collar has an annular peripheral groove, $o$, and is caused to move back and forth upon the shaft by means of an arm, P, which has at one end a pivotal connection with a bell-crank lever, R. The remaining end of the arm P is forked and engages in the annular groove of the collar.

Q indicates the hook for drawing the ends of the binding-cord through the loop. This hook, which is arranged to work through the hollow fixed jaw, is pivoted to the forward end of a lever, Q', which is in turn pivoted at or about its middle within the slot of the rotary knotter-shaft. The lever Q' has a projection, $q$, in front and a projection, $q'$, in rear of its pivot, and has its rear end bent outwardly, as at $q^2$. These projections and bent end of the lever are acted upon by the sliding collar at different times, so as to cause the requisite movements of the hook, which is controlled by the movements of the lever. When the collar is at the forward end of the rotary shaft, its cam projection $o'$ will act against the lug or short arm $n'$ on the pivoted jaw and open the latter, so as to admit the binding-cord between the two jaws. In this position the collar will be over the projection $q$ on the front end of lever Q, and, forcing the same within the slot, depress such end of the lever, and thereby cause the hook to be retracted within the hollow rigid jaw, where it will be out of the way of the binding-cord as the latter is received between the two jaws. When the pivoted jaw is thus open, its arm will be swung out to some extent. If, now, the collar is moved backward, it will first push the arm of the pivoted jaw back into position alongside the rotary shaft, and thereby close said jaw, and as the collar continues to move back it will next act on the projection $q'$ of lever Q', in rear of the pivotal point of the latter, and by depressing the rear end of the lever—that is to say, pushing it back into the slot in the bar—the forward end of the lever will move in a reverse direction, and thereby project the hook from the hollow jaw, so as to engage the binding-cord, in order to draw the ends through the loop, which, during such backward movement of the collar, has been formed around the fixed jaw by reason of a rotary motion imparted to the shaft by means which will be presently described. The hook having now engaged the cord, it is retracted within the hollow fixed jaw by the action of the collar against the rear bent end, $q^2$, of lever Q', which end extends out from the rotary shaft at a side opposite to that at which the projections $q$ $q'$ were extended. The collar also depresses the rear bent end, $n^2$, of the arm N' of the pivoted jaw, thereby opening said jaw and allowing the loop to slip off from the rigid hollow jaw. The knot is thus completed, and as soon as the collar moves forward over the projection $q'$ of the lever Q, so that the hook shall be again projected and a reverse rotation given to the rotary shaft, the cord will slip off from the hook. After the formation of the knot the rotating shaft is moved back from the binder-arm a short distance, so as to draw the knot tight, and after the knot has been completed the rotating shaft is moved forward, as will be hereinafter described.

The rotary shaft L, which carries the knotting devices, has a spirally-threaded portion, L', which passes through a block, $L^2$, pivoted in the end of the long arm of bell-crank lever R. This block, which fits the rotary knotter-shaft L, causes the latter to rotate alternately in reverse directions as the bell-crank lever carrying the block is vibrated. As the knotter-shaft has a limited longitudinal play it will be advanced and retracted or moved backward by the bell-crank lever and connections. In order, however, to prevent the backward movement of the knotter-shaft until after the cord has been secured by the jaws and looped around the hollow jaw, I provide a latch, S, which is pivoted to the main frame and adapted to drop against the rear end of the knotter-shaft. This latch has a heel-extension or arm, $s$, located in the path of the long arm of the bell-crank lever R, and arranged so that when the lever passes over said arm or extension of the latch the same will be depressed and the latch raised, which movement will take place as soon as the cord has been grasped and looped around the jaw, which is rigid with the knotter-shaft. The bell-crank lever is actuated at the proper moment by a pitman, R', which is pivoted at one end to the lever $f$. This pitman is provided with a slot, $r$, and is guided by the vertical post $r'$, which passes up through said slot. As will be seen, the bell-crank lever R vibrates about the post $r'$, and the pitman rests upon the short arm of the bell-crank lever. The pitman is provided at its forward end with a notch, $R^2$, and a projection, $r^2$, which engage the wrist-pin $r^3$ on the short arm of the bell-crank lever at the proper moment when the pitman is drawn back for the purpose of actuating the bell-crank lever, and thereby operating the arm P, so as to draw back the collar O on the knotter-shaft, and also causing the rotation of the knotter-shaft through the medium of the block, which is carried by the bell-crank lever, and arranged to work upon the spirally-threaded portion of the knotter-shaft. As the pitman R' is thrown forward one of the walls of its notch $R^2$ will give an impulse to the bell-crank lever before the pitman is disengaged from the wrist-pin on the latter, which movement on the part of the bell-crank will, through the medium of the connections already described, throw the knotter-shaft forward and rotate the same in a direction reverse to that in which it turned in forming the knot, so as to allow the cord to slip off the hook, which, during these said movements of the knotter-shaft, will be projected from the hollow jaw by reason of the collar O sliding forward over one of the projections on the pivoted lever, with which the hook is connected. As soon as the wrist-pin is clear of the notch in pitman R' the bell-crank lever will remain stationary until a shoulder, $r^4$, on the pitman strikes the said wrist-pin and gives another impulse to the bell-crank lever, which will, through the medium of the pivoted block, cause the knotter-shaft to turn sufficiently to bring the jaws in position to receive the cord for another gavel, and through the medium of arm P slide collar O to the forward end of the knotter-shaft and cause the cam projection on the front side of the collar to strike against the projection on one side of the pivoted jaw.

By the above arrangement of devices the collar O is caused to move back and forth and the knotter-shaft to rotate at the required moments for operating the knotting devices, the action of which has already been described.

The various parts of the mechanism are so timed that the binder-arm operates at the proper moments for carrying the cord to the holder and passing it over the gavel which is to be bound. The remaining parts all successively come into operation by reason of their various connections with the main operating-lever $f$, as described.

T indicates the rake for carrying off the bundles. This rake is pivoted to a slide, T', which moves on an elevated horizontal guide-bar, $t$, supported above the way $t'$, which is in the nature of a rear extension of the platform. The slide carrying the rake is connected with a lever, $T^2$, by means of a connecting-rod, so that as said lever is vibrated the slide and rake will be moved back and forth. The lever $T^2$ is pivoted at one end to the main frame, and is actuated by a connecting-rod, $T^3$, which connects the lever with a crank-arm upon the axle of the sprocket-wheel. The rod $T^3$ has a slotted connection with the lever $T^2$, so that the rod shall have a certain extent of motion before actuating the lever. A two-armed dog, $T^4$, is pivoted to the rake-slide, and two stops, $t^2$, are located upon the bar $t$, or upon the bar and one of its supports, in the path of the lower arm of the dog. When the slide is drawn back, the lower arm of the dog strikes the rear stop, whereby the dog will be turned, so that its upper arm will raise and hold up the rake. When the slide is moved forward and the rake brought over the bundles, the lower arm of the dog will strike the forward stop, and thereby cause the dog to turn, so as to trip the rake and allow it to engage the bundle.

U indicates a case for containing the spool of binding-cord. This box or case is mounted on standard $d$, and is provided with a hinged cover, $u$, having an opening for the passage of the cord, which is carried from said case over a guide, $u'$, and thence over the pulleys in the binder-arm.

I have represented and described a rake for delivering loose grain to my improved compressing and binding devices. This rake and its actuating devices are not herein claimed, as they will form the subject of another patent.

I am aware that it is not new to employ a finger-bar and cutters which are adjustable forward and backward upon the main frame, and therefore I do not, broadly, claim such mechanism.

The rotary fingers, which have been described, are designed for holding one end of the binding-cord during the operation of the cord-carrying arm in passing the cord about a bundle of grain, and also for receiving the opposite portion of the cord after the bundle has been surrounded by it, and holding the same while the knot-tyer performs its work. Then the cord is severed.

Having thus described my invention, what I claim is—

1. The combination, with the movable finger-bar, of the connected angular levers for adjusting the same, and the rod $B'$, for operating said levers, substantially as described.

2. The combination, with the movable finger-bar, of the connected angular levers for adjusting the same, the notched rod $B'$, for operating said levers, and the catch $b^4$, for engaging the notched portion of the rod, substantially as described.

3. The combination of the compressor arm $D$ with a compressing-cord connected therewith for compressing the gavel, its short arm $D^4$, the connecting-link $d^5$, and lever $D^5$, and the cord-tightener, which is actuated so as to tighten the compressing-cord upon the gavel to the required extent, and then automatically released by the means substantially as described.

4. The reciprocatory bar E, notched, as described, to which one end of the cord for compressing the gavel is attached, in combination with lever $f$, link $f^2$, crank-arm $f'$, fast on the shaft of the sprocket-wheel $C^3$, spring-catches $E'$, and conical head or shoulder $F'$, for drawing back said bar until the cord has been suitably tightened, and then releasing said bar, for the purpose specified.

5. The combination, with the bar E, carrying a pair of spring-jaws, of the hollow rod F, having a conical head, $F'$, and receiving the rear end of bar E, said hollow rod being connected with an operating-lever, which, when swung forward, forces the conical head between the spring-jaws, and which, when swung back, disengages the head from the jaws after the gavel has been sufficiently compressed by the cord, which is attached to the bar carrying the spring-jaws, substantially as described.

6. The combination, with the bar E, of the jaws pivoted thereon, and provided with spring-shanks $e^2$, the nut fitted upon a screw-threaded portion of the bar, between the spring-shanks of the jaws, and the device, substantially as described, which is automatically engaged with and disengaged from said jaws, for the purpose specified.

7. The combination, with the bar E, notched, as described, for tightening the compressing-cord, of the pivoted lever $D^5$, connected with the compressor-arm, and provided with a slot, $d^6$, through which said bar passes, and a tripping-finger, $d^7$, which, when the lever is raised, lifts the bar and disengages a notch in the latter from the lever, substantially as described.

8. The combination, with the bar E, carrying a pair of spring-jaws, and provided with notches $e^3$ $e^4$, of the pivoted lever $D^5$, connected with the compressor-arm, and provided with a slot, $d^6$, and a tripping-finger, $d^7$, and the hollow rod F, having a conical head, substantially as described.

9. The combination, with the rotary knotter-shaft provided at one end with a fixed jaw, M, of the pivoted jaw N, provided with a lug, $n'$, and with an arm bent at its end, the hook Q, connected with a pivoted lever, $Q'$, which has the cam projections $q$ and $q'$, and a bent end, $q^2$, the collar O, fitted to slide on the knotter-shaft, over the said lever and the arm of the pivoted jaw, and adapted to act upon the lug of the pivoted jaw, so as to open the latter, and means, substantially as described, for operating the collar, substantially as described.

10. The combination, with the rotary and longitudinally-movable knotter-shaft carrying the knotting devices, of the latch S, for preventing the backward movement of the knotter-shaft until the cord has been grasped by the jaws and the loop formed, substantially as described.

11. The combination, with the knotter-shaft, the knotting devices, the bell-crank lever, and connections for operating the shaft, and the devices for tying the knot, of the pitman $R'$, provided with a notch, $R^2$, which engages a wrist-pin on the bell-crank lever when the pitman is moved back, substantially as described.

12. The combination, with the bell-crank lever R, and means, substantially as described, for tying the knot, of the pitman $R'$, provided at one end with notch $R^2$ and projection $r^2$, and at a point near its opposite end with a shoulder, $r^4$, substantially as and for the purpose described.

13. The combination of the vibrating arm $D^5$, having a tappet, with the compressor-arm carrying the compressing-cord, the connecting-link between the compression-arm and vibrating arm, and a reciprocating actuating-bar having the mechanism for automatically releasing the tension on the compressing-cord, all constructed and adapted to operate substantially in the manner and for the purposes described.

14. The combination of the pivoted bundle-discharging rake, a horizontal guide-bar, a slide thereon, a two-armed rocking dog on the slide, and stops or trips located at the termini of the strokes of the rake, all constructed and adapted to operate substantially in the manner and for the purposes described.

15. The combination, with the rotary knotter-shaft provided at one end with a hollow fixed jaw, of the hook which works through the jaw, connected with a lever which is pivoted in the knotter-shaft, the pivoted jaw having an arm extended backward along said shaft, and the sliding collar fitted upon the knotter-shaft, and adapted when moved forward to open the pivoted jaw, and when moved backward to close the same and cause the hook to be successively projected and retracted, substantially as described.

16. The combination, with the rotary slotted knotter-shaft provided at one end with a fixed hollow jaw, M, around which the loop is formed, of the pivoted jaw N, for holding the cord while the loop is being formed, the hook Q, for drawing the ends through the loop, and the sliding collar O, for opening and closing the pivoted jaw and causing the hook to be projected from and retracted within the hollow jaw, substantially as described.

17. The combination, with the rotary knotter-shaft carrying the fixed and pivoted jaws, the hook, and a lever for operating the same, of the sliding grooved collar O, which operates the lever and the pivoted jaw, the arm P, having its forward forked end engaging the grooved collar and its rear end pivoted to a bell-crank lever, substantially as specified.

In testimony that I claim the foregoing as my own I affix my signature in presence of two witnesses.

CHRISTOPHER LIDREN.

Witnesses:
S. H. TOBIAS,
JOHN W. GAY.